(12) United States Patent
Hossfield et al.

(10) Patent No.: US 6,418,856 B2
(45) Date of Patent: *Jul. 16, 2002

(54) PASSIVE STEERING ASSEMBLY FOR A GUIDED VEHICLE

(75) Inventors: Robin Hossfield, Medway, MA (US); John Puhlhorn, Danbury, NH (US); David C. Collins, Burlington; Marvin Fredburg, Stoughton, both of MA (US)

(73) Assignee: Raytheon Company, Lexington, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,196

(22) Filed: Nov. 11, 1999

(51) Int. Cl.[7] ................................................. E01B 7/00
(52) U.S. Cl. ............................... 104/130.1; 104/130.7; 104/247; 104/246; 280/89.11; 280/89.13
(58) Field of Search ................................. 104/247, 245, 104/130.1, 130.7, 242, 246; 105/141, 144; 280/89, 89.1, 89.11, 89.12, 89.13

(56) References Cited

U.S. PATENT DOCUMENTS

| 989,958 A | 4/1911 | Frahm |
| 2,016,207 A | 10/1935 | Lindenberg |
| 2,503,120 A | * 4/1950 | Meyer ........................ 104/247 |
| 2,744,749 A | 5/1956 | Fiedor |
| 2,887,071 A | 5/1959 | Settles |
| 2,901,239 A | 8/1959 | Sethna |
| 3,673,966 A | * 7/1972 | Wilson ........................ 104/1 R |
| 3,675,583 A | 7/1972 | Sobey et al. |
| 3,788,233 A | 1/1974 | Colovas et al. |
| 3,792,871 A | 2/1974 | Chalmers |
| 3,796,165 A | * 3/1974 | Goode ........................ 104/247 |

(List continued on next page.)

FOREIGN PATENT DOCUMENTS

| DE | 1 161 936 | 1/1964 | |
| DE | 14 05 857 A | 6/1970 | |
| DE | 2721071 A1 | * 11/1978 | ........... B61B/13/00 |
| DE | 34 13 224 A | 11/1985 | |
| DE | 40 32 378 | 4/1992 | |
| DE | 43 01 986 A | 7/1994 | |
| DE | 198 28 393 A1 | 7/1999 | |
| EP | 88 241 B1 | 9/1983 | |
| EP | 464 720 A1 | 1/1992 | |
| EP | 625 815 A2 | 11/1994 | |
| EP | 747 281 A2 | 12/1996 | |
| EP | 747 281 A3 | 8/1997 | |
| FR | 605894 | 6/1926 | |
| FR | 2 652 375 | 3/1991 | |
| GB | 1 118 853 A | 7/1968 | |
| GB | 1208900 | * 10/1970 | ................. 104/247 |
| SE | WO98 46467 | 10/1998 | |

Primary Examiner—S. Joseph Morano
Assistant Examiner—Frantz F. Jules
(74) Attorney, Agent, or Firm—Iandiorio & Teska (57) ABSTRACT

A passive steering assembly for a guided vehicle movable along a guideway includes a vehicle including at least one axle structure; a pivot joint at each end of the axle structure; a wheel mounting pivotably engaged with each pivot joint; a hub for rotatably mounting a wheel to each wheel mounting; a wheel connected to each hub for moving the vehicle; and a lateral guide device for controlling the lateral position of the axle structure for steering the wheels to follow the path of the guideway and to a passive steering system including a plurality of such assemblies.

16 Claims, 9 Drawing Sheets

U.S. PATENT DOCUMENTS

| | | | | |
|---|---|---|---|---|
| 3,811,383 A | * | 5/1974 | Butzow | 104/130 |
| 3,814,025 A | | 6/1974 | Nelson | |
| 3,831,527 A | | 8/1974 | Peterson | |
| 3,881,427 A | | 5/1975 | Blume | |
| 3,894,602 A | * | 7/1975 | Von Der Ohe | 180/43 R |
| 3,906,866 A | * | 9/1975 | Knippel | 104/139 |
| 3,913,491 A | * | 10/1975 | Auer, Jr. et al. | 104/130 |
| 3,977,487 A | | 8/1976 | Katayose et al. | 104/244.1 |
| 4,036,146 A | * | 7/1977 | Tyus | 104/119 |
| 4,064,967 A | * | 12/1977 | Doolittle | 180/155 |
| 4,092,930 A | | 6/1978 | Takemura et al. | |
| 4,183,304 A | * | 1/1980 | Forster | 104/119 |
| 4,213,396 A | * | 7/1980 | Mehren et al. | 104/130.05 |
| 4,223,611 A | * | 9/1980 | Dawson et al. | 104/247 |
| 4,259,810 A | | 4/1981 | West | |
| 4,265,180 A | * | 5/1981 | Uozumi | 104/247 |
| 4,267,779 A | | 5/1981 | Binder | |
| 4,418,931 A | * | 12/1983 | Howard | 280/94 |
| 4,436,170 A | | 3/1984 | Mehren et al. | |
| 4,522,128 A | | 6/1985 | Anderson | |
| 4,600,205 A | * | 7/1986 | Stewart et al. | 280/95 R |
| 4,644,692 A | | 2/1987 | Schindehutte | |
| 4,671,185 A | | 6/1987 | Anderson et al. | |
| 4,708,695 A | | 11/1987 | Sugiyama | |
| 4,765,648 A | | 8/1988 | Mander et al. | |
| 4,798,254 A | | 1/1989 | Lings | |
| 4,803,804 A | | 2/1989 | Bryant | |
| 4,940,914 A | | 7/1990 | Mizuno et al. | |
| 4,953,472 A | | 9/1990 | Tutzer | |
| 4,960,290 A | | 10/1990 | Bose | |
| 5,067,608 A | | 11/1991 | McLellan | |
| 5,094,312 A | * | 3/1992 | Hakel | 180/132 |
| 5,148,631 A | | 9/1992 | Bayard et al. | |
| 5,277,124 A | | 1/1994 | DiFonso et al. | |
| 5,431,261 A | | 7/1995 | Olgac | |
| 5,443,282 A | | 8/1995 | Gipser | |
| 5,551,190 A | | 9/1996 | Yamagishi et al. | |
| 5,558,191 A | | 9/1996 | Lai | |
| 5,607,028 A | * | 3/1997 | Braun et al. | 180/408 |
| 5,755,059 A | | 5/1998 | Schap | |
| 5,832,665 A | | 11/1998 | Miller et al. | |
| 5,845,581 A | | 12/1998 | Svensson | |
| 5,848,663 A | | 12/1998 | Kuriki | |
| 5,906,071 A | | 5/1999 | Buchanan, Jr. | |
| 5,921,026 A | | 7/1999 | Miller | |
| 5,979,114 A | | 11/1999 | Clark et al. | |
| 6,009,671 A | | 1/2000 | Sasaki | |
| 6,120,401 A | | 9/2000 | Wilken | |

* cited by examiner

PASSIVE STEERING ASSEMBLY FOR A GUIDED VEHICLE

FIELD OF INVENTION

This invention relates to a passive steering assembly for a guided vehicle movable along a guideway and to a passive steering system using a plurality of such assemblies.

BACKGROUND OF INVENTION

Rubber tired transit vehicles are commonly used in personal rapid transit guided vehicle systems. Most employ some type of steering system. Vehicle steering systems are used to generate lateral loads, typically at the tire patch, to turn vehicles and offset lateral vehicle inertia and wind loads. Such lateral loads can be as high as one quarter of the weight of the vehicle. There are three different types of tire steering system categories currently used as follows: (1) mechanical sensing with power steering; (2) electromagnetic (wire follower) sensing with power steering; and (3) mechanical sensing, passive steering.

The first two steering systems categories are known as active steering. The first typically employs a mechanical sensor which establishes the lateral distance between the vehicle and reference surface on the guideway such as the guideway's vertical wall. This distance is used by an electronic controller which activates a power steering system, steers the wheels, and thereby generates the required steering forces which actively turn the vehicle. The forces generated by the tires can be as high as one quarter of the weight of the vehicle. The second type also uses an automatic controller to activate a power steering system, steer the wheels, and thereby generate the required steering forces which turn the vehicle. But, unlike the first system, the second system uses a transmission wire laid within the guideway as the vehicle position reference. Both of the first two steering systems suffer from certain deficiencies. First, since the vehicles are steered from lateral forces generated by the tires, vehicle roll stability when negotiating turns is adversely affected. To maximize vehicle roll stability it would be more advantageous to react lateral steering loads higher and closer to the vehicle center of gravity. To offset this disadvantage, such actively steered vehicles must employ a wider track width and hence a wider guideway. The second disadvantage is that both active steering systems are complex and costly. Guideways are wider and therefore heavier; wire following guideways are more complex, and both steering systems require elaborate controls and hydraulic/pneumatic steering drives.

The third steering system category is mechanical sensing with passive steering. Unlike the first two categories, there is no electronic controller or power steering. The vehicle follows a vertical surface of the guideway. Forces required to steer the vehicle wheels are developed through mechanical steering linkages which reach directly off of the guideway vertical surface. Prior art passive steering systems occur in two different configurations: wagon wheel and Ackermann. For wagon wheel passive steering, each axle is fixed to a rotatable truck. The tires always remain coaxial with the axle. The axis of truck rotation is vertical and located at the center of the axle (which is also the center of the truck). Each truck also has four lateral wheels (two per side). Two are located forward of the axle and two to the rear. The lateral wheels contact the sides of the guideway and thereby rotate the truck and steer the axle and wheels. Typically, there are two truck/axle assemblies per vehicle. Forward and reverse travel are allowable.

Passive Ackermann steering more closely resembles that found on an automotive vehicle. Here the wheels on each axle steer about kingpin axes located in close proximity to each wheel. Left and right wheels on each axle are tied together with a tie rod or relay link. The steering linkage is configured such that the inboard wheel turns slightly more than the outboard tire when in a turn (Ackermann steering). In prior art, a spring connected to the steering linkage biases the vehicle to steer into one of the guideway side walls. A mechanical link with cam follower attached to the steering linkage follows the side of the guideway. If the vehicle is too close to the side of the guideway, the follower steers the vehicle away from the side of the guideway. Steering equilibrium is reached when the tire lateral forces are offset by the cam follower's lateral load on the guideway.

While the passively steered wagon wheel concept has the advantage of reverse travel capability, it has a number of drawbacks. First, is has more moving parts and would therefore tend to be less reliable. Second, the trucks are heavy. This has an adverse effect on guideway size, weight and cost. In addition, a heavier unsprung mass (truck) would have a negative impact on ride quality. Third, like the active steering systems, lateral vehicle forces are reacted well below the vehicle center of gravity, thereby leading to vehicle roll instability unless a wider and more massive guideway is employed. And fourth, experience shows that friction between each truck and the chassis frame is ample enough to prevent proper wheel/guideway alignment thereby leading to more tire wear. The passively steered Ackermann steering concept has certain advantages over the wagon wheel concept. They include smaller spatial requirements and lighter unsprung mass. This enables a compact design, less weight, and enhanced ride quality. Unfortunately prior art passive Ackermann also comes with some drawbacks. First, the tires are always scrubbing into one of the two guideway walls. This causes excessive tire wear and adversely affects ride quality. Second, like all prior art discussed above, steering forces are generated well below the vehicle center of gravity. This degrades vehicle roll stability when negotiating turns. Third, reverse travel is unstable.

BRIEF SUMMARY OF THE INVENTION

It is therefore an object of this invention to provide an improved passive steering assembly for a guided vehicle and to an improved passive steering system employing a plurality of such passive steering assemblies.

It is a further object of this invention to provide such an improved passive steering assembly which reduces guideway size, mass and cost.

It is a further object of this invention to provide such an improved passive steering assembly which reduces lateral loads at the tires.

It is a further object of this invention to provide such an improved passive steering assembly which reduces tire wear and improves tractive capability.

It is a further object of this invention to provide such an improved passive steering assembly which reduces control and hydraulic/pneumatic equipment and complexity.

It is a further object of this invention to provide such an improved passive steering assembly which improves reliability.

It is a further object of this invention to provide such an improved passive steering assembly which accommodates reverse travel.

It is a further object of this invention to provide such an improved passive steering assembly which reduces lateral loads on the guideway.

It is a further object of this invention to provide such an improved passive steering assembly which has higher roll stability with narrower guideways.

It is a further object of this invention to provide such an improved passive steering assembly which can be implemented with essentially stock components.

It is a further object of this invention to provide such an improved passive steering assembly which steers passively by forces at the tire patch.

It is a further object of this invention to provide such an improved passive steering assembly which has small scrub radius to reduce upsetting steering moments during braking.

It is a further object of this invention to provide such an improved passive steering assembly which has a large caster angle to reduce lateral tire forces.

The invention results from the realization that a truly simple, safe, reliable and economical passive steering assembly for a guided vehicle which reduces the lateral forces on the tires can be achieved by using a lateral guide device such as the lateral suspension system or vehicle switching system of the vehicle to orient the vehicle in the guideway and permit the wheels to follow the path of the guideway and automatically, passively steer along it. Two further realizations are that: lateral forces at the tires can be reduced, stability and tire wear improved, and narrow guideways are possible by reacting vehicle lateral forces at or near the vehicle center of gravity and allowing the vertical support tires to passively steer; and that more accurate steering and load compensation from left to right tires is possible by using Ackerman type steering.

This invention features a passive steering assembly for a guided vehicle moveable along a guideway including a vehicle having at least one axle structure, a pivot joint at each end of the axle stricture, and a wheel mounting pivotably engaged with each pivot joint. There is a hub for rotatably mounting a wheel to each wheel mounting, a wheel connected to each hub for moving the vehicle, and a lateral guide device for controlling the lateral position of the axle structure for steering the wheels to follow the path of the guideway.

In a preferred embodiment there may be a tie rod interconnected between the wheel mountings for balancing steering loads on the wheels. There may be a locking device for fixing the wheel mountings to prevent steering the wheels when the vehicle moves in reverse. The locking device may include a locking unit interconnected with each wheel mounting. The lateral guide device may include a lateral suspension system and the lateral suspension system may interact with the guideway at approximately the height of the center of gravity of the vehicle. The lateral guide device may also include a vehicle switch system. The tie rod and the wheel mountings may be connected in an Ackermann steering linkage.

This invention also features a passive steering system for a guided vehicle movable along a guideway having a vehicle including two axle structures, a pivot joint at each end of each axle structure, and a wheel mounting pivotably engaged with each pivot joint. There is a hub for rotatably mounting a wheel to each wheel mounting and a wheel on each wheel mounting for movably supporting the vehicle. A lateral guide device controls the lateral position of the axle structures for steering the wheels to follow the path of the guideway.

In a preferred embodiment there may be a tie rod interconnected between the wheel mountings on each axle structure for balancing steering loads on the wheels. The tie rods may be interconnected with their respective wheels on the inboard side of the axle structures. The tie rod and wheel mountings may be connected in an Ackermann steering linkage.

BRIEF DESCRIPTION OF THE DRAWINGS

Other objects, features and advantages will occur to those skilled in the art from the following description of a preferred embodiment and the accompanying drawings, in which.

Figure 1:
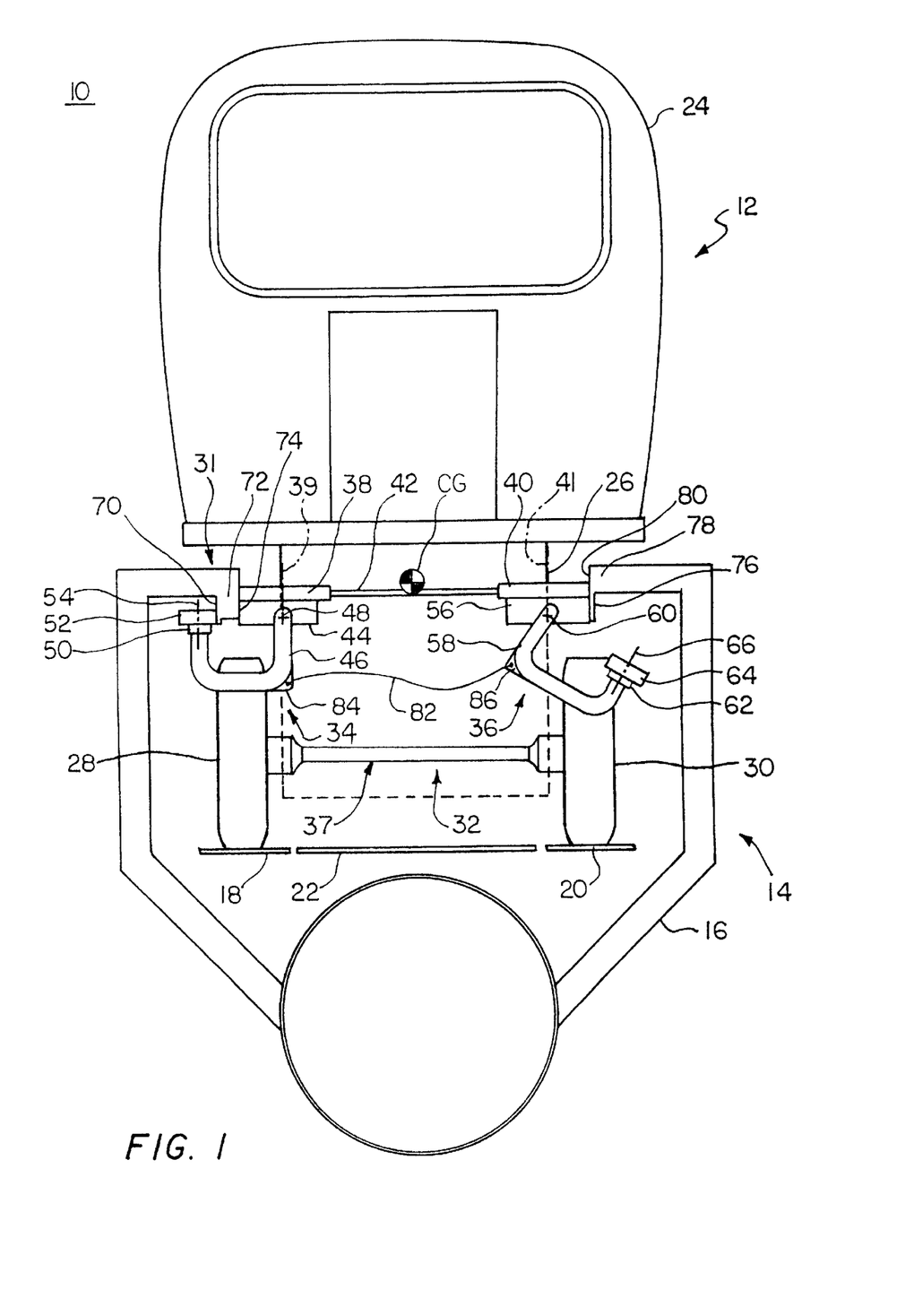
FIG. 1 is a schematic end view of a guided vehicle and guideway of a guided vehicle system using the passive steering assembly according to this invention.

There is shown in FIG. 1 a guided vehicle system 10 including a vehicle 12 which moves on a guideway 14. Guideway 14 includes a support structure including main running surfaces 18 and 20 and a walkway or grate 22. Guided vehicle 12 includes cabin 24 mounted on chassis 26 which rolls on four main support tires only two of which, 28 and 30, are shown, supported on running surfaces 18 and 20. Mounted on chassis 26 is a lateral suspension assembly 31 and an in-vehicle switch system 32 including two in-vehicle switch mechanisms 34 and 36 and a passive steering assembly 37 shown very simply schematically. Lateral suspension system 31 and in-vehicle switch systems 32, 34 are shown approximately aligned with the center of gravity CG of the vehicle for purposes of stability and reducing deleterious forces as will be understood hereafter. A lateral suspension system is shown in a copending application filed on even date herewith, "Lateral Suspension Assembly for a Guided Vehicle System", by David C. Collins, Albert E. Lewis, and Gerald A. Garneau, Jr. An in-vehicle switch system is shown in a U.S. patent application filed on even date herewith entitled "In-Vehicle Switch Mechanism" by David C. Collins, Albert E. Lewis, and Gerald A. Garneau. Both of these applications are assigned to Raytheon Company and are incorporated herein by reference in their entirety. Either or both the lateral suspension system or the in-vehicle switch system may constitute a lateral guide device for operating the steering assembly of this invention. In other types of guided vehicle systems, e.g., wire follower, other implementations of the lateral guide device may be used. Lateral suspension assembly 31 and in-vehicle switch systems 32 and 34 will be explained first with reference to FIGS. 2–4 before the discussion of the passive steering assembly 37 according to this invention in FIGS. 5–11.

Figure 2:
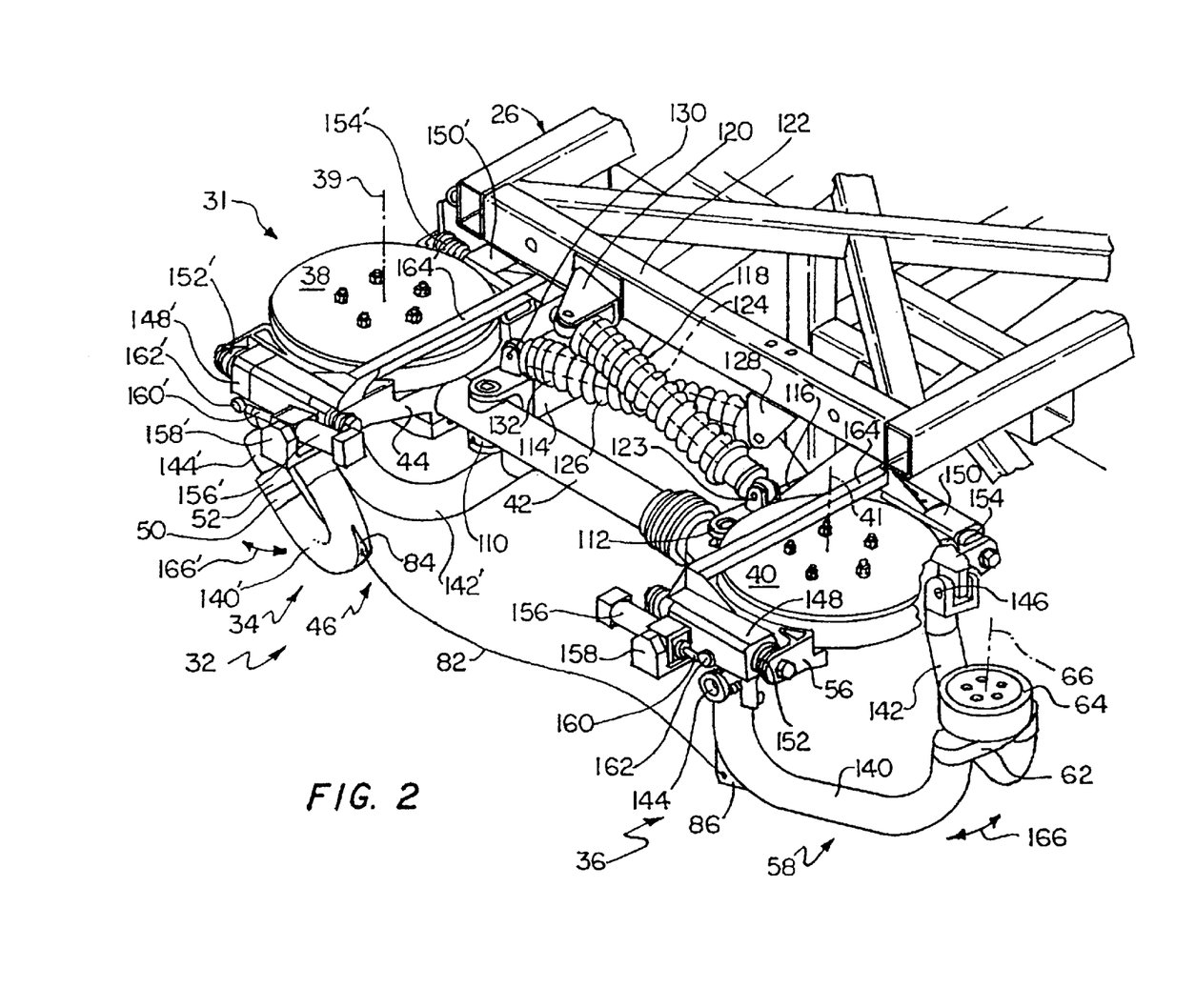
FIG. 2 is a three-dimensional view of two in-vehicle switch mechanisms, a lateral suspension system, a vehicle chassis frame.

Lateral suspension system 31 includes lateral guide wheels 38 and 40 rotatable about axes 39 and 41 interconnected by a lateral limit link 42. The lateral outward travel of guide wheels 38 and 40 is limited by lateral limit link 42. Both guide wheels 38 and 40 are urged outwardly by spring biasing means as will be explained hereinafter and is shown in greater detail in the application cited supra. Lateral guide wheel 38 shares support frame 44 with switch arm assembly 46 of switch mechanism 34. Switch arm assembly 46 includes a spindle housing 50 which supports switch wheel 52 rotatable about axis 54. Similarly, lateral guide wheel 40 shares support frame 56 with in-vehicle switch mechanism 36. Switch arm assembly 58 is rotatable about pivot axis 146 at its proximate end and at its distal end includes a spindle housing 62 which rotatably supports switch wheel 64 that rotates about axis 66. Switch mechanism 34 is shown with the switch arm assembly 46 in the deployed position so that switch wheel 52 is engaging the outside or switching surface 70 of guide rail 72 while the inside or guiding surface 74 of guide rail 72 is engaged with lateral guide wheel 38. In contrast, switch arm assembly 58 is in the stowed position so that switch wheel 64 is out of contact with switching surface 76 of guide rail 78 while lateral guide wheel 40 engages the guiding surface 80 of guide rail 78. A limiter member 82 interconnected between mount 84 of switch mechanism 34 and mount 86 of switch mechanism 36 ensures that one and only one of switch arm assemblies 46 and 58 can be in the deployed position. In the subsequent discussion of the figures like parts have been given like numbers and similar parts like numbers accompanied by a lower case letter or prime.

Lateral suspension system 31 and in-vehicle switch system 32 are shown in greater detail in FIGS. 2, 3 and 4 taken together in the following discussion. Lateral suspension system 31 includes lateral guide wheels 38 and 40 mounted in support frames 44 and 56 for rotation about their respective axes 39 and 41. Support frames 44 and 56 each are pivotally supported by a clevis 110, 112 where they interconnect with lateral limit link 42. Clevises 110 and 112 are carried in turn by supports 114 and 116 which are pivotally attached to chassis 26 at points not shown. A bias device such as spring 118 is attached at one end by clevis 120 to cross bar 122 of chassis 26. At its other end spring 118 is attached to clevis 123 fixed to arm 116. In this way spring 118 provides a constant force urging lateral guide wheel 40 outwardly to engage a guide rail. Spring 118 may include a shock absorber 124 for damping the action of spring 118 and maintaining a smooth constant contact of wheel 40 with its associated guide rail. A second spring 126 is mounted to clevis 128 which is fixed to the underside of cross bar 122. The other end of spring 126 is attached to clevis 130 which is fixed to support 114. It also may include a shock absorber 132 (shown in phantom) so that spring 126 provides a constant force to keep wheel 38 against its associated guide rail. Lateral limit link 42 ensures that even under the urging of springs 118 and 126 lateral guide wheels 38 and 40 will not go beyond a predetermined safe limit even when the guide rails diverge.

Figure 3:
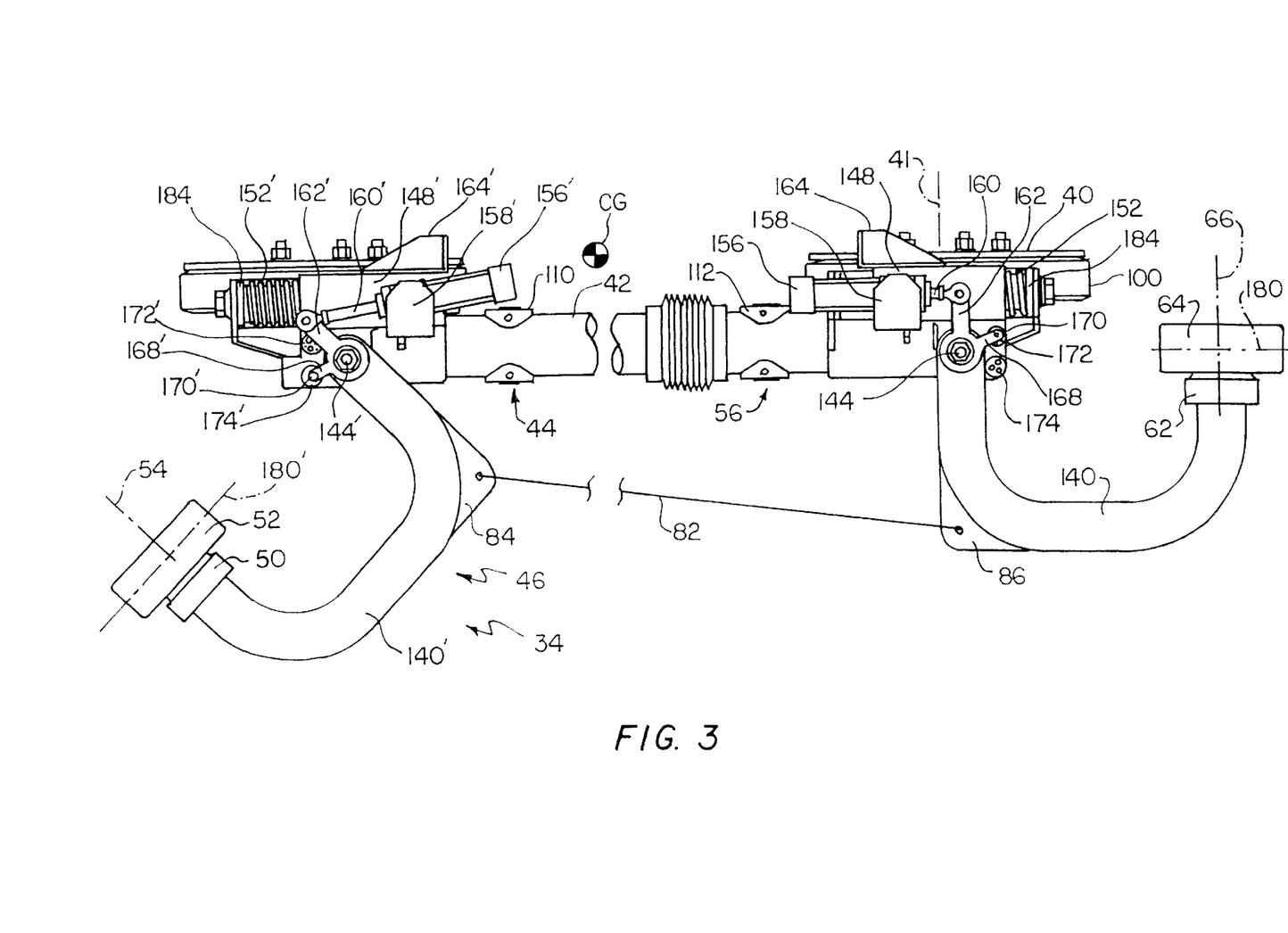
FIG. 3 is a diagrammatic front elevational view of the lateral suspension system and in-vehicle switch mechanisms of FIG. 2.
Figure 4:
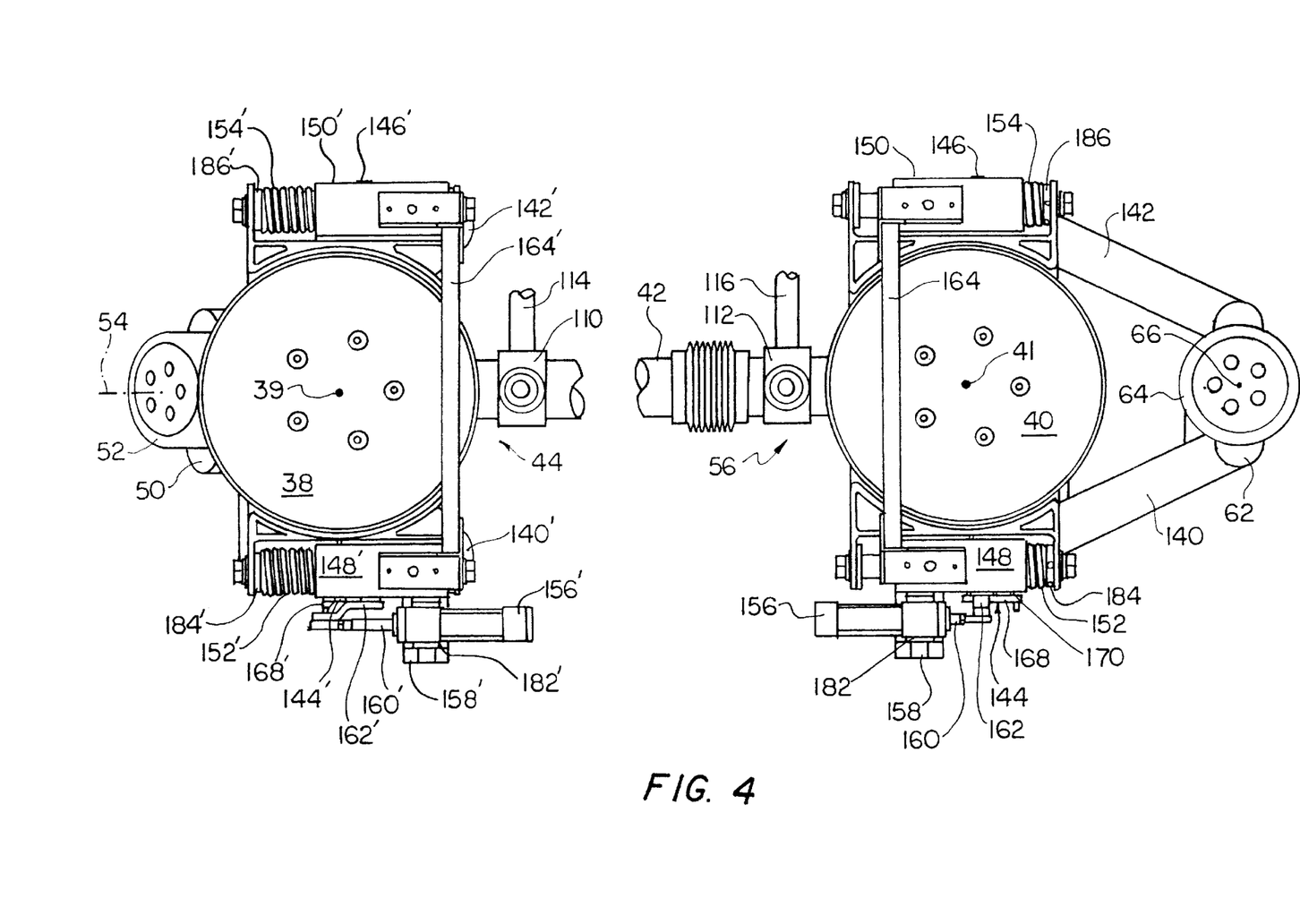
FIG. 4 is a top plan view similar to FIG. 3.

Both in-vehicle switch mechanisms 34 and 36 of in-vehicle switch system 32 are shown in FIGS. 2, 3 and 4. In each of these figures switch assembly 58 is shown deployed while switch assembly 46 is shown stowed. A description of in-vehicle switch mechanism 36 will suffice to explain the operation of the identical in-vehicle switch mechanism 34. Switch arm assembly 58 actually includes a pair of arms 140, 142 which support spindle 62. Each arm is connected at pivots 144, 146. Pivots 144 and 146 are on pivot assembly which includes two pivot units 148 and 150. Pivot units 148 and 150 are interconnected with the support frame by a biasing means, in this case two springs 152 and 154 which provide a force that drives the pivot assembly, and thus arms 140 and 142, and switch wheel 164 inwardly so that it grips and engages the switching surface of its associated guide rail. An actuator, typically an electrically or hydraulically driven solenoid, 156 mounted in bracket 158 fixed to pivot unit 148 drives arms 140 and 142 between the deployed and the stowed positions by means of piston 160 and link 162. An anti-roll bar 164 is interconnected between pivot units 148 and 150 to prevent arms 140 and 142 of switch arm assembly 58 from undesirably canting or rotating in the direction of arrow 166.

As can be seen more clearly in FIG. 3, link 162 includes an arm 168 which carries magnet 170. Directly beneath magnet 170 on pivot unit 148 is a triple redundant Hall effect sensor 172 which senses when magnet 170 is opposite it to give an indication that switch wheel 64 is in a deployed position. When through the action of actuator 156 arm 140 is in the stowed position then piston 160 will be in the extended position and arm 168 will be rotated downwardly so that magnet 170 is over a second triple redundant Hall effect sensor 174 indicating that switch 64 is in the stowed position. This is the situation shown with respect to switch assembly 46. Note that pivot 144 is substantially in line with the center line 180 of switch wheel 64. This is done to reduce effectively to zero any moments that would tend to urge wheel 64 away from its engagement with its associated guide rail.

An adjustment wheel 184 is used to adjust spring 152 and adjustment wheel 186 is used to adjust spring 154 to provide the proper inward force on wheel 64. Adjustment wheel 186 is visible in FIG. 4. Also visible in FIG. 4 is actuator 156 connected to bracket 158 by means of rubber mounting 182 in order to accommodate minor misalignments such as caused by the arcuate motion of arm 162.

The passive steering assembly according to this invention consists of a steerable axle, two rod ends, a tie rod, a hydraulic damper and a centering piston with bracketry. The assembly is simple and lightweight so that cost, realiability, maintenance and weight minimization is realized. Typically there are two such assemblies used to form a passive steering system according to this invention. Thus there are two steerable axles per vehicle. Either or both axles can be driven by a separate motor. Each passive steering assembly is attached to the vehicle with a vertical suspension system. As the passively steered vehicle moves through the guideway, lateral wind loads and inertial loads due to guideway curves are reacted by the lateral suspension and switch system which is located close to the vehicle center of gravity. The passively steered pneumatic tires are free to steer in the direction of vehicle travel due only to forces at the tire patch thereby minimizing lateral tire loads. These loads, instead of being one quarter of the vehicle weight are less than 100 pounds. The reduced lateral tire loads have the effect of minimizing tire, wheel bearing, and tie rod wear and thereby maximize steering system reliability. Since lateral vehicle loads are reacted close to the vehicle center of gravity rather than the tire patch, the vehicle overturning moment is minimized and therefore vehicle roll stability is maximized for the same width guideway. Guideway size, mass, and cost are therefore minimized for such a passively steered vehicle. The vertical support tires function to support the weight of the vehicle and to accelerate/brake the vehicle. Reduction of tire lateral loads also improves the tractive capability of the vehicle. For all pneumatic tires peak tractive capacity occurs when lateral tire forces are absent. Tractive capacities decrease with an increase in lateral tire forces. Thus, for a given guideway surface with a characteristic coefficient of friction, the tractive capability of the tires is maximized during important maneuvers such as acceleration and braking. Reduced lateral tire loads also reduce the overall load that can be imparted into the guideway structure. The vertical support tires steer with the direction of vehicle travel rather than steering against a vertical guideway surface.

Figure 5:
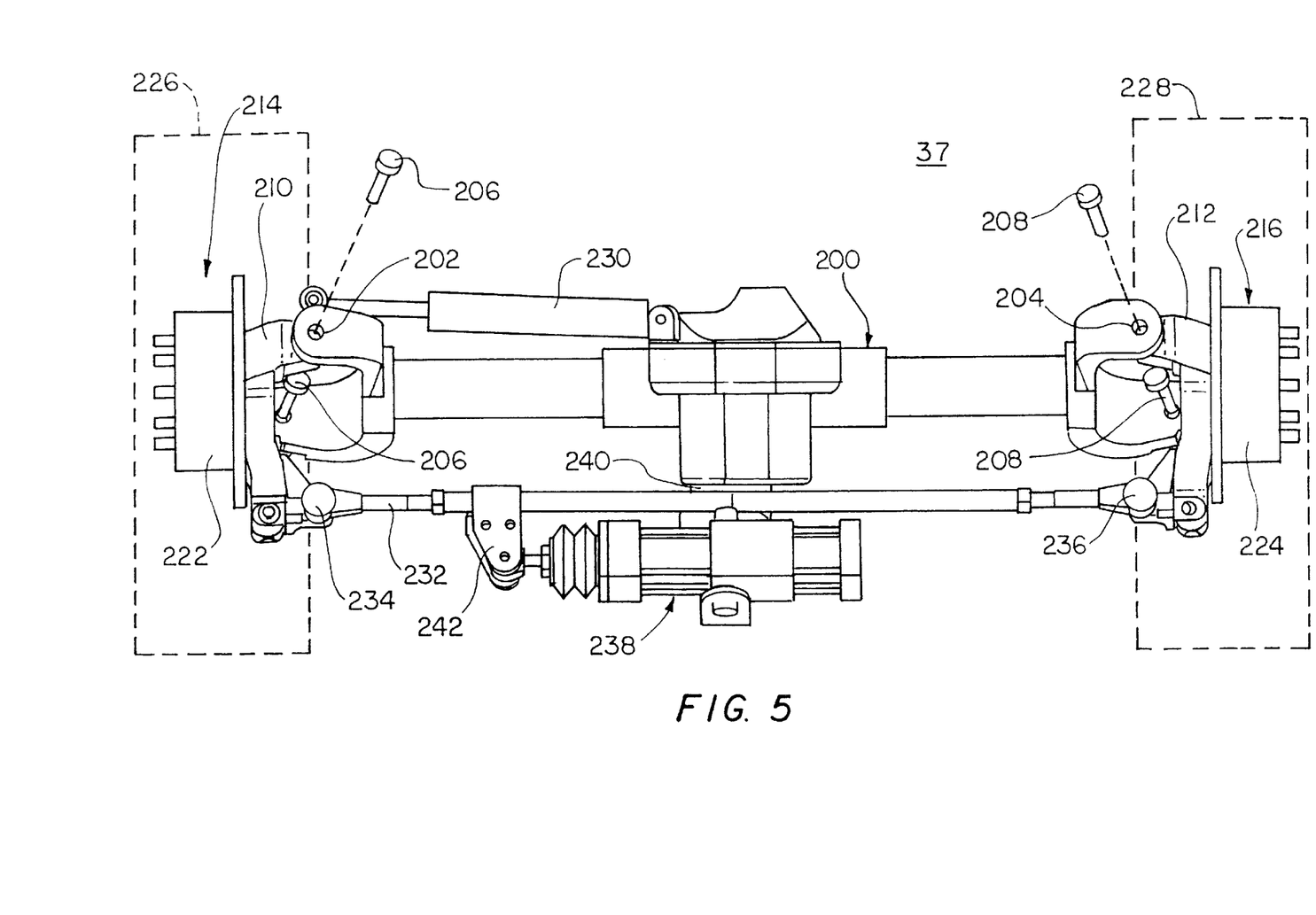
FIG. 5 is a top plan diagrammatic view of a passive steering assembly according to this invention.
Figure 6:
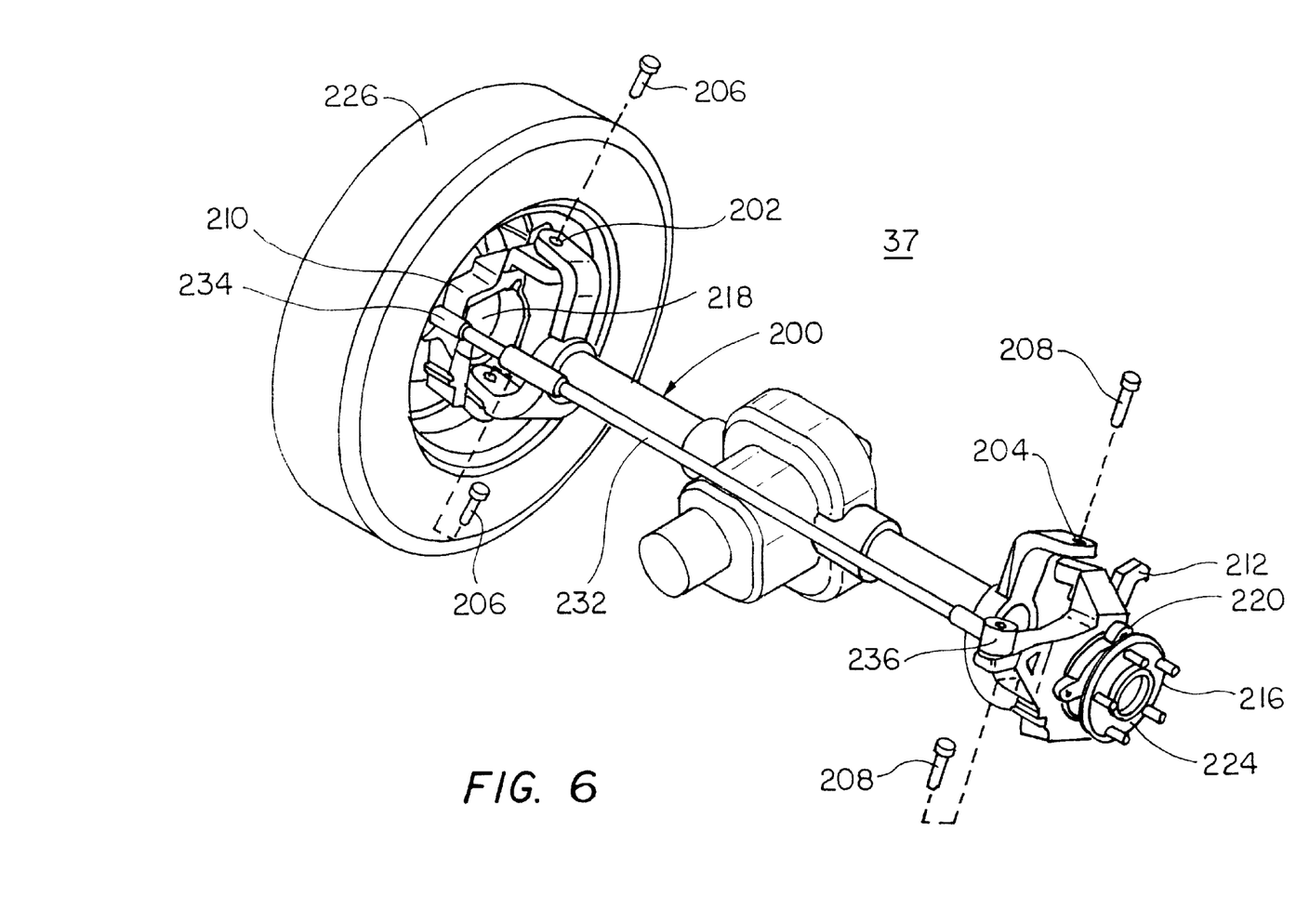
FIG. 6 is a three-dimensional view of the passive steering assembly of FIG. 5 with the reverse centering cylinder, damper and one tire removed.

A passive steering assembly 37, FIGS. 5 and 6, according to this invention includes axle structure 200 which has a pivot point 202, 204 at each end where ball joints 206, 208 engage with wheel mounts 210 and 212. On each wheel mounting 210, 212 there is mounted a hub 214, 216 which has a fixed portion 218, 220, and a rotatable portion 222, 224. Brake rotors, wheel and tires 214, 216, 226, 228 are mounted on the rotatable portion of hub 222 and 224. A shock absorber or damper 230, shown only in FIG. 5, is provided to prevent shimmy and dampen disturbances and improve ride comfort. A relay link or tie rod 232 is interconnected at pivot points 234 and 236 to wheel mountings 210 and 212, effecting an Ackermann type of linkage. The axle, pivot, wheel mounts, hubs and tie rods are essentially stock automotive parts making the construction of this vehicle simple and relatively inexpensive. A centering cylinder 238, FIG. 5, is connected to axle structure 200 by means of bracket 240 and to tie rod 232 by means of bracket 242. When it is desired to run the vehicle in reverse cylinder 238 is operated to steer and lock the tires straight forward as will be explained hereinafter.

In forward vehicle operation forces generated at the tire patch passively steer the pneumatic tires in the direction of vehicle travel. For example, as the vehicle moves from a straight to a curved guideway section, forces generated at the tire patch steer the tires from straight to either left or right. If the vehicle is not accelerating, the lateral forces required to steer the tires are typically only due to friction in the rotatable steering joints and hence are extremely small. When the vehicle is accelerating or braking, these lateral forces are slightly larger as will be discussed below.

Figure 7:
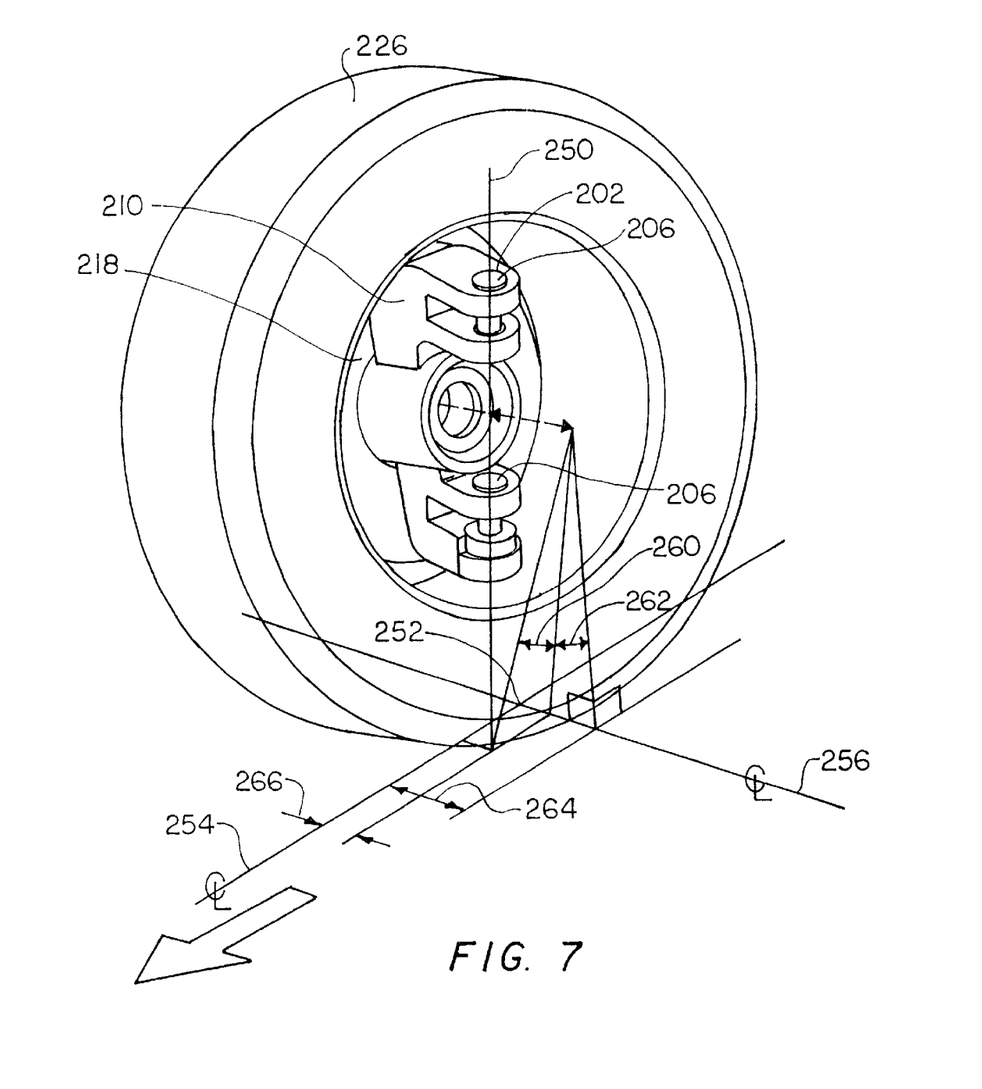
FIG. 7 is a three-dimensional view of one tire with hub and wheel mount illustrating caster and kingpin angle, kingpin offset, and scrub radius.

There is shown in FIG. 7 tire 226 and its wheel mount 210 illustrating certain of the aspects of the tire and axle configuration. The steering axis 250 passes through the pivot point 202 and ball joints 206. The center of tire contact or tire patch 252 occurs at the intersection of the longitudinal center line 254 and latitudinal center line 256. The caster angle 260 is made large, typically, though not necessarily, 25°. The kingpin inclination angle 262 is set at 11°. The kingpin offset 264 is 2.73 inches and the scrub radius 266 is merely 0.36 inch. For the small steering angles encountered in transit applications (less than 2 degrees), three steering axis geometry parameters are of chief importance. These parameters include the scrub radius, caster angle and kingpin offset. The caster angle provides restoring moments which offset the disturbing moments generated by the effects of the scrub radius and kingpin offset.

Figure 13:
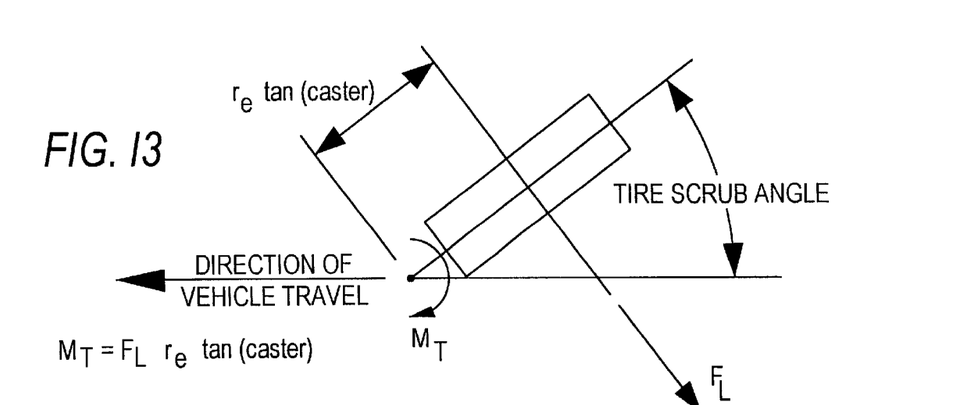

As can be seen from FIG. 13 (which shows the plan view of a tire with pure caster for the purpose of clarity) the larger the caster angle, the higher the restoring moment. The restoring moment automatically steers the tire about the kingpin axis until the tire is oriented in the direction of vehicle travel. To maximize the tire restoring moment for minimum tire lateral force, the caster angle was set to 25 degrees. In most automotive applications caster angles of between 5 and 10 degrees are used.

FIG. 13 is intended to demonstrate the affect of the tire scrub radius. For clarity, a plan view of a vertical kingpin axis is shown. The scrub radius is important when the vehicle is decelerating with brake calipers. During such a vehicle braking maneuver, the tractive forces at F1 and F2 generate moments about the kingpin/steering axes located at A and B respectively. Obviously, such moments are higher for larger scrub radii. Further, if the tractive forces at F1 and F2 are equal, the tie rod balances the imposed moments and the tires do not steer off course. Unfortunately, it is frequent when the tractive forces at F1 and F2 are not equal during caliper braking. Such imbalances commonly occur when one side of the guideway has less friction than the other side. If the scrub radius were large, the tires would steer away from the direction of vehicle travel and significant lateral tire loads would be generated. Therefore, it is apparent that lateral tire loads are reduced if the scrub radius is minimized. Here, the scrub radius is 0.36 inches.

The kingpin offset can generate significant disturbing moments when the vehicle is accelerated or braked through the drive shafts. Here the moment from the drive shaft can be resolved into one component which rotates the wheel about its kingpin or steering axis. The moment about the steering axis is larger for longer kingpin offsets and hence the disturbing moments are also larger. If the left and right tire torques are equal, the disturbing steering moments are balanced through the relay link. If the torques are not equal, the more heavily torqued tire will steer the vehicle toward the more lightly loaded tire and away from the vehicle's direction of travel. Unfortunately, this situation can occur if one side of the guideway has less friction than the other side and a limited slip differential is used. In this embodiment, the kingpin offset was set to the smallest practical value, 2.73 inches. During vehicle acceleration, when this disturbing moment is generated, it is offset by restoring moment generated by the large 25 degree caster angle. Maximum lateral tire loads are thereby limited to less than 100 pounds.

Figures 8, 9, 10:
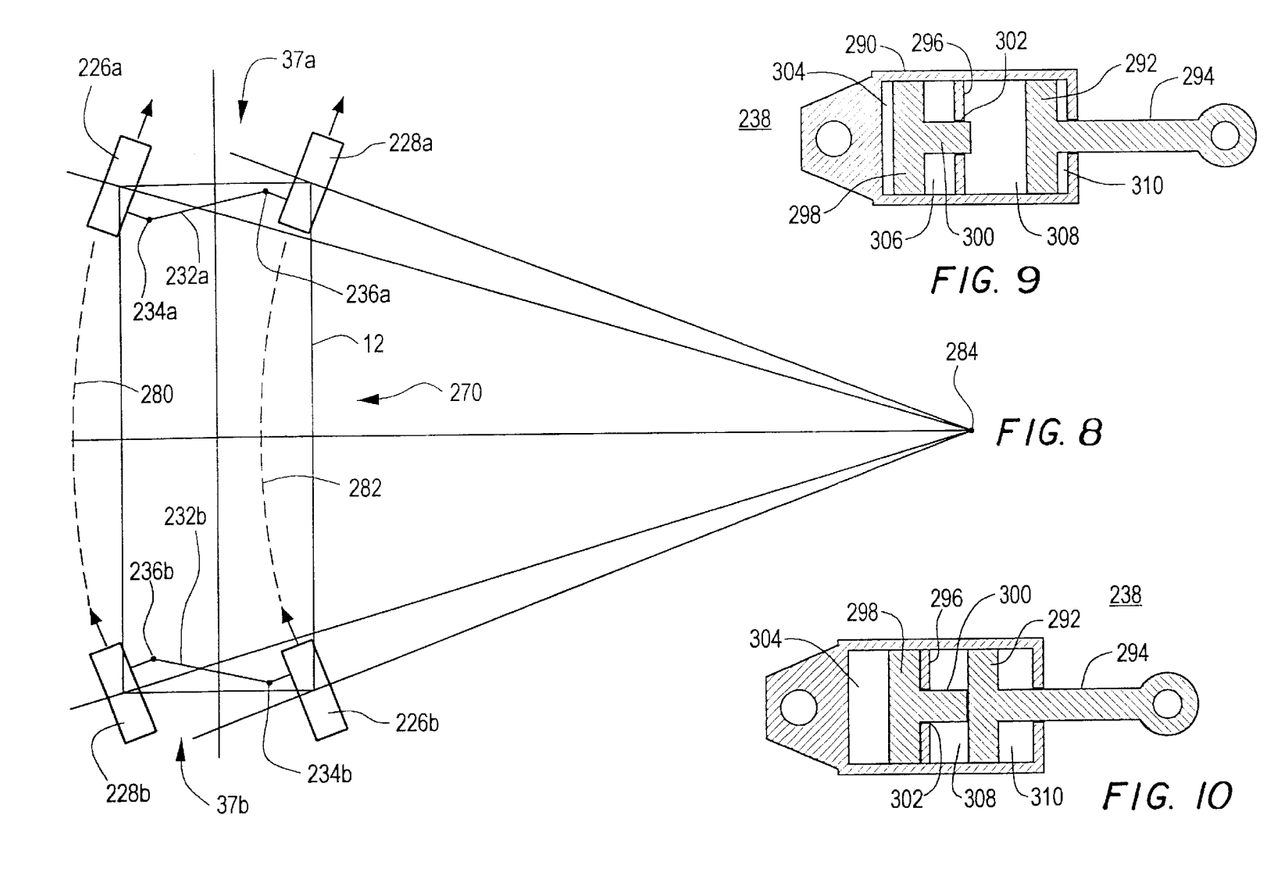
FIG. 8 is a schematic plan view of two passive steering assemblies arranged in a passive steering system of the Ackermann type, according to this invention.
FIGS. 9 and 10 are schematic sectional views of the reverse centering cylinder of FIG. 5 in the forward and reverse modes.

Typically the passive steering assemblies 37 are used in pairs 37a, 37b, FIG. 8, to form a passive steering system 270 with the tie rods 232a, 232b mounted on the inboard side of each assembly so that when in a curve all four tires 226a, 228a, 226b, 228b will be tangent to the vehicle direction of travel as shown by tracks 280 and 282, FIG. 8. All of the tires steer around a single steer center 284. The axle structures and certain other parts have been eliminated in FIG. 8 to aid in the clarity of understanding. The steering or turn center 284 is located on an axis which is the perpendicular bisector of the vehicle center line. This turn center position 284 is accomplished by the use of the two steerable axles. Such a turn center serves to minimize guideway width requirements. If a different turn center had been used, for example, a non-steerable rear axle, the rear tires would not track over the front tire prints. The guideway would then have to be widened by perhaps six inches in this case to eliminate tire scrub and lateral tire forces.

The first centering cylinder 238, FIG. 9, includes a cylindrical housing 290, a piston 292 having an external connecting rod 294 for connection to bracket 242 for example, while housing 290 is connected to axle structure 200 bracket 240. A wall 296 divides housing 290 in two parts. To the right is piston 292, to the left is free-floating piston 298 whose connecting rod or shaft 300 is slidingly mounted in hole 302 in wall 296. This creates chambers 304, 306, 308 and 310. In the free-floating position for forward operation, as shown in FIG. 9, all four chambers are unpressurized and the pistons 292 and 298 are free to move. However, in the reverse operation, when it is desired to move the vehicle backwards, reverse centering cylinder 238 is center locked. That is, chambers 304 and 310 are pressurized; chambers 306 and 308 are not. This drives piston 298 to the right as shown in FIG. 10 until it stops against wall 296. Its connecting rod or shaft 300 engages piston 292 which has been driven to the left by the pressure in chamber 310, thereby locking housing 290 and shaft 294 to a center position. If left alone during reverse operation the vehicle wheels would steer to one of their two limits. The tires would scrub and exert lateral forces through the axle, chassis and lateral suspension system and the lateral guide device to the guideway. To minimize these loads during reverse operation the reverse centering cylinder is used to lock the tires at the center. This effectively reduces lateral tire load by a factor of two. That is, an uncentered, unlocked steering system may have its tires scrubbing at 8.2° while the center or locked steering system limits tire scrub to 4.1°.

Figure 11:
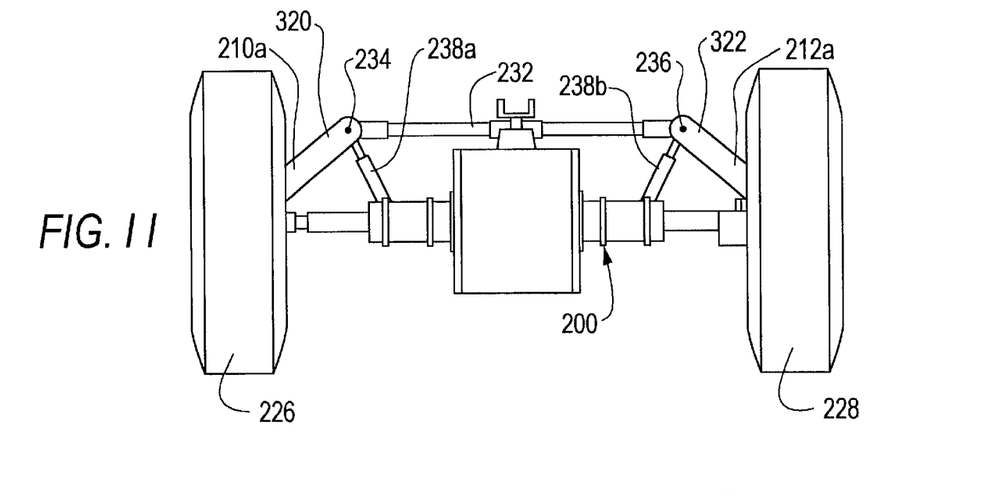
FIG. 11 is a simplified view similar to FIG. 8 of an alternative construction of the passive steering assembly according to this invention.
Figure 12:
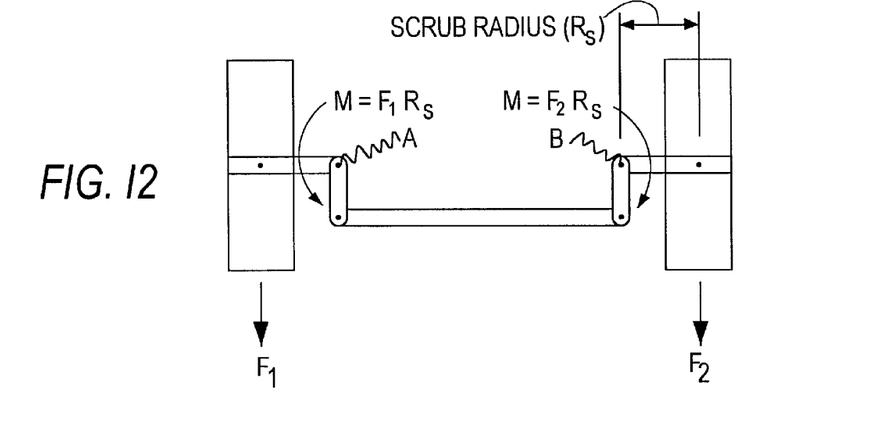
FIGS. 12 and 13 are schematic drawings showing forces and moments on the components.

Although the system is shown with a single damping cylinder 230 and single centering cylinder 238, FIG. 5, these are not necessary limitations of the invention. For example, as shown in FIG. 11, there may be two reverse centering cylinders 238a and 238b, one associated with each steering arm 320, 322 of each wheel mount 210a, 212a. This becomes more important if tie rod or relay link 232 is not used.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A passive steering assembly for a guided vehicle movable along a guideway, comprising:
   the vehicle including at least one axle structure;
   a pivot joint at each end of said axle structure;
   a wheel mounting pivotably engaged with each said pivot joint;
   a hub for rotatably mounting a wheel to each said wheel mounting, the wheel connected to each said hub for moving said vehicle; and
   a spring biased lateral guide device including at least two separately and independently biased members which engage with the guideway to control the lateral position of said axle structure and for steering each of said wheels to follow the path of the guideway, wherein said spring biased lateral guide device is independent of said axle structure.

2. The passive steering assembly for a guided vehicle movable along a guideway of claim 1 further including a tie rod interconnected between each of said wheel mountings for balancing steering loads on each of said wheels.

3. The passive steering assembly for a guided vehicle movable along a guideway of claim 2 further including a locking device interconnected with said tie rod for preventing steering of each of said wheels when the vehicle moves in reverse.

4. The passive steering assembly for a guided vehicle movable along a guideway of claim 1 further including a locking device for fixing each of said wheel mountings to prevent steering of said wheels when the vehicle moves in reverse.

5. The passive steering assembly for a guided vehicle movable along a guideway of claim 4 in which said locking device includes a locking unit interconnected with each said wheel mounting.

6. The passive steering assembly for a guided vehicle movable along a guideway of claim 1 in which said spring biased lateral guide device includes a lateral suspension system.

7. The passive steering assembly for a guided vehicle movable along a guideway of claim 6 in which said lateral suspension system interacts with the guideway at approximately the height of the center of gravity of the vehicle.

8. The passive steering assembly for a guided vehicle movable along a guideway of claim 1 in which said spring biased lateral guide device includes an in-vehicle switch system.

9. A passive steering system for a guided vehicle movable along a guideway comprising:
   the vehicle including two axle structures, each said axle structure having an inboard side and an outboard side;
   a pivot joint at each end of each said axle structure;
   a wheel mounting pivotably engaged with each said pivot joint;
   a hub for rotatably mounting a wheel to each said wheel mounting, the wheel on each said wheel mounting for movably supporting said vehicle; and
   a spring biased lateral guide device including at least two separately and independently biased members which engage with the guideway to control the lateral position of said axle structures and for steering each of said wheels to follow the path of the guideway, wherein said spring biased lateral guide device is independent of said axle structure.

10. The passive steering system for a guided vehicle of claim 9 further including a tie rod interconnected between each of said wheel mountings on each said axle structure for balancing steering loads on each of said wheels.

11. The passive steering system for a guided vehicle of claim 10 in which said tie rods are interconnected with their respective wheels on the inboard side of said axle structures.

12. A passive steering assembly for a guided vehicle movable along a guideway, comprising:
   the vehicle including at least one axle structure;
   a pivot joint at each end of said axle structure;
   a wheel mounting pivotably engaged with each said pivot joint;
   a hub for rotatably mounting a wheel to each said wheel mounting, the wheel connected to each said hub for moving said vehicle;
   a lateral guide device for controlling the lateral position of said axle structure for steering each of said wheels to follow the path of the guideway; and
   a locking device for fixing each of said wheel mountings to prevent steering of each of said wheels when the vehicle moves in reverse.

13. The passive steering assembly for a guided vehicle movable along a guideway of claim 12 in which said locking device includes a locking unit interconnected with each said wheel mounting.

14. A passive steering assembly for a guided vehicle movable along a guideway, comprising:
   the vehicle including at least one axle structure;
   a pivot joint at each end of said axle structure;
   a wheel mounting pivotably engaged with each said pivot joint;

a hub for rotatably mounting a wheel to each said wheel mounting, the wheel connected to each said hub for moving said vehicle; and a lateral guide device for controlling the lateral position of said axle structure for steering each of said wheels to follow the path of the guideway;

a tie rod interconnected between each of said wheel mountings for balancing steering loads on each of said wheels; and a locking device interconnected with said tie rod for preventing steering of each said wheels when the vehicle moves in reverse.

15. A passive steering assembly for a guided vehicle movable along a guideway, comprising:

the vehicle including at least one axle structure;

a pivot joint at each end of said axle structure;

a wheel mounting pivotably engaged with each said pivot joint;

a hub for rotatably mounting a wheel to each said wheel mounting, the wheel connected to each said hub for moving said vehicle; and a spring biased lateral guide device for controlling the lateral position of said axle structure for steering each of said wheels to follow the path of the guideway, said spring biased lateral guide device including a lateral suspension system which interacts with the guideway at approximately the height of the center of gravity of the vehicle, wherein said spring biased lateral guide device is independent of said axle structure.

16. A passive steering assembly for a guided vehicle movable along a guideway, comprising:

the vehicle including at least one axle structure;

a pivot joint at each end of said axle structure;

a wheel mounting pivotably engaged with each said pivot joint;

a hub for rotatably mounting a wheel to each said wheel mounting, the wheel connected to each said hub for moving said vehicle; and a spring biased lateral guide device including at least two separately and independently biased members which engage with the guideway to control the lateral position of said axle structure and for orienting each of said wheels to follow the path of the guideway, wherein said spring biased lateral guide device is independent of said axle structure.

* * * * *